United States Patent [19]

Bährle et al.

[11] Patent Number: 4,689,680
[45] Date of Patent: Aug. 25, 1987

[54] CIRCUIT ARRANGEMENT FOR GENERATING CLAMPING PULSES

[75] Inventors: Peter Bährle, Nuremburg; Heinz Lange, Heroldsberg, both of Fed. Rep. of Germany

[73] Assignee: U.S. Philips Corporation, New York, N.Y.

[21] Appl. No.: 756,142

[22] Filed: Jul. 17, 1985

[30] Foreign Application Priority Data

Aug. 1, 1984 [DE] Fed. Rep. of Germany ....... 3428301

[51] Int. Cl.$^4$ .............................................. H04N 5/18
[52] U.S. Cl. ................................................. 358/172
[58] Field of Search ............... 358/171, 172, 160, 166, 358/173

[56] References Cited

U.S. PATENT DOCUMENTS 3,819,859 6/1974 Borsuk ................................. 358/172
4,218,706 8/1980 Brinegar ............................... 358/172

FOREIGN PATENT DOCUMENTS 1809362 7/1972 Fed. Rep. of Germany .
2162955 9/1977 Fed. Rep. of Germany .
2811221 9/1979 Fed. Rep. of Germany .

Primary Examiner—Tommy P. Chin
Attorney, Agent, or Firm—Thomas A. Briody; William J. Streeter; Gregory P. Gadson

[57] ABSTRACT

A circuit arrangement for producing clamping pulses for a clamping circuit for the regeneration of the average picture luminance of a video signal wherein the synchronizing pulses are separated from the video signal by a clipping stage and applied to two monostable multivibrators. Line-frequency clock pulses are produced from the video signal pulses and the vertical blanking interval is detected with the aid of a counting circuit which is driven by the monostable multivibrators. This counting circuit always selects one of the two outputs of a further counting circuit, from which outputs clamping pulse signals are supplied at different instants.

8 Claims, 4 Drawing Figures

CIRCUIT ARRANGEMENT FOR GENERATING CLAMPING PULSES

BACKGROUND OF THE INVENTION

The invention relates to a circuit arrangement for generating clamping pulses for a clamping circuit for the regeneration of the average picture luminance of a video signal.

Clamping circuits are used to superimpose a d.c. voltage on an a.c. voltage signal. In video signals the d.c. voltage portion represents the average picture luminance. Clamping circuits for regenerating the average picture luminance, have been known for a long time already and can be dimensioned according to their use. In a television receiver a simple level diode circuit which keeps the black level constant, satisfies, for example, all the requirements.

When used at the head of a television transmission system the requirements which such a clamping circuit must satisfy are significantly higher, to ensure that the maximum capability of the transmission system can be utilized to the best possible extent. For analog amplifiers this can be the amplifier saturation limit, for digital transmission the characteristic of the A/D converter. In addition, the clamping circuit must be capable of eliminating transient phenomena of preceding transmission systems and superposed low-frequency noise voltages.

German Patent No. 1,809,362 discloses a circuit arrangement which satisfies these requirements. This circuit arrangement operates in accordance with the keyed clamping circuit principal, and locks the signal onto the synchronizing pulse level.

However, as soon as video signals with accompanying sound must be transmitted via such a circuit arrangement in accordance with the Sound-in-Sync(SIS) method, the picture is disturbed to a considerable extent.

These interferences can be reduced to such a level that they are no longer visible, by means of a circuit arrangement described in German Patent application No. 2811221. They are, however, basically still present and maintaining an appropriate signal-to-noise ratio requires a great deal of testing and adjusting efforts and costs.

A known method uses line-frequency clamping of the video signal on the back porch of the horizontal blanking interval, for which a keyed clamping circuit is used. Such a keyed clamping circuit may be formed by a switch and a clamping capacitor. The circuit is switched to the conducting state by each pulse of a clamping pulse signal and as a result thereof the capacitor is charged to the clamping voltage. The clamping pulses can be derived from the leading or trailing edge of the horizontal synchronizing pulse. Deriving the clamping pulses from the leading edge has however the disadvantage that the edges of a sound-in-sync signal transmitted in the synchronizing pulse again trigger clamping pulses during the synchronizing pulse period, which pulses become first active in the picture range and consequently produce significant interferences. Moreover, errors in the vertical blanking interval (V-interval) cannot be completely avoided with circuits of the above type, as the length of the synchronizing bottom lever in the synchronizing pulses and during the V-interval greatly differ from each other.

This might be remedied by making the clamping inoperative during the V-interval, as described in German Patent No. 2162955. If signals with superposed low-frequency noise voltages were present in a circuit as described in this patent, then ramps would be produced in the V-interval in accordance with the superposed interference, which would be modulated into the signal. An additional difficulty for the dimensioning of an optimum clamping circuit is embodied by the accompanying sound in the TV-PCM2 method, which operates with a shortened synchronizing pulse and in which, before and after the color burst, the sound information is contained in the form of PCM pulses. Because of this method it is also no longer possible to derive the clamping pulses from the trailing edge of the synchronizing pulse, which would often be of considerable advantage with regard to the V-interval.

SUMMARY OF THE INVENTION

The object of the present invention is to provide a clamping circuit for the regeneration of the average picture luminance of a video signal, a circuit arrangement for producing clamping pulses, which circuit operates reliably and interference-free, irrespective of the standard (PAL, SECAM or NTSC) of the transmitted video signal and irrespective of whether an additional sound signal in accordance with one of the two methods, sound-in-sync or TV-PCM2, are transmitted at the same time.

According to the invention, this object is accomplished in that line-frequency clock pulses are produced from the video signal pulses with the aid of monostable multivibrators and that the vertical blanking interval is deteted by means of a first counting circuit which is driven by one of the monostable multivibrators. This first counting circuit always selects one of the outputs of a second counting circuit, from which outputs clamping pulse signals are supplied at different instants.

The invention will now be described in greater detail by way of example with reference to the embodiments shown in the accompanying figures in which

DESCRIPTION OF THE PREFERRED EMBODIMENT

Figure 1:
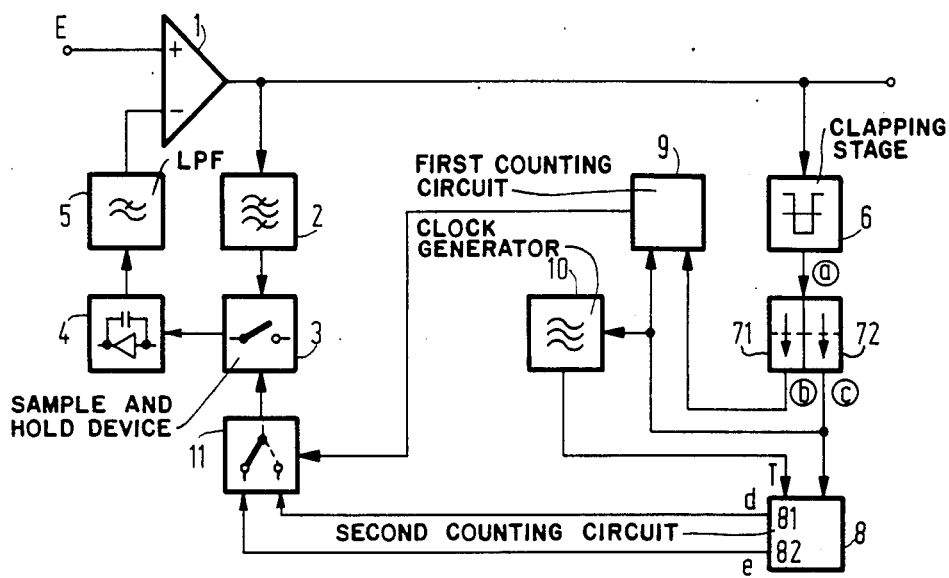
FIG. 1 shows a block circuit diagram of a circuit arrangement for regenerating the average picture luminance.

In FIG. 1, the video signal is applied from an input E of the circuit arrangement to an amplifier 1, which has a second input for receiving a clamping voltage. The clamped signal is applied via a chrominance carrier bandstop filter 2 to a sample-and-hold circuit 3, to whose second input clamping pulses are applied. The output signal of the sample-and-hold circuit 3 is applied to an integrator 4, in which the compensating voltage for the clamping is obtained therefrom. A low-pass filter 5 arranged between the integrator 4 and the second input of the amplifier 1 prevents clock pulse residues of an oscillator from reaching the video signal path.

Figure 2:
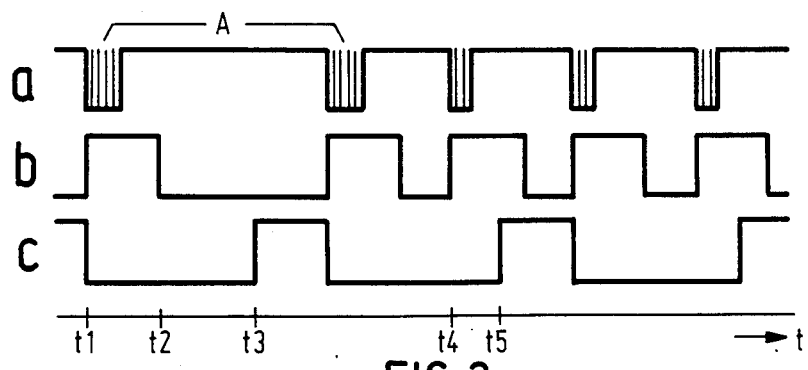
FIGS. 2 to 4 show time diagrams for deriving the synchronizing pulses and the clamping pulses.

In addition, the video signal also reaches from the output of the amplifier 1 a clipping stage 6, by which the synchronizing pulses are separated from the video signal. The output pulses of the clipping stage 6, shown in the diagram of FIG. 2 in line a, are applied to two non-retriggerably monostable multivibrators 71 and 72, which may both be integrated in one IC. The vertical lines A denote SIS-pulses.

The two monostable multivibrators 71 and 72 have different time constants. The first monostable multivibrator 71 has a time constant which exceeds the duration of a synchronizing pulse and is less than half a line period, while the time constant of the second monostable multivibrator 72 exceeds half the line period and is less than the overall line period. The output signal of the monostable multivibrator 71 is shown in line b of FIG. 2, the output signal of the monostable multivabrator 72 is shown in line c.

These two monostable multivibrators 71 and 72 are each set at the beginning of the horizontal blanking interval (time t1 in FIG. 2) by the leading edge of a synchronizing pulse. The first monostable multivibrator 71 has returned again to its starting state at the end of half a line period (t2), but the second monostable multivabrator 72 has not. This monostable multivibrator does not return to its starting state until just before the end of the line period (t3). The SIS pulses (A) used in the sound-in-sync method for transmitting the sound information are inserted into the synchronizing pulse. Their leading edges cannot affect the two monostable multivibrators 71 and 72, as they are both set by the leading edge of the synchronizing pulses and cannot be started again by the leading edge of any subsequent pulses as long as they have not previously returned to their starting state. SIS-pulses (A) do not occur after the first monostable multivibrator 71 has returned to its starting state, as its time constant exceeds the duration of the synchronizing pulse.

The pulses at the output of the monostable multivibrator 72 appear at the line frequency, also during the V-interval, as the monostable multivibrator 72 is always started again during this period of time by the leading edge of every alternate equalizing pulse and field pulse.

The output of the monostable multivibrator 72 is connected to the synchronizing input of a clock generator 10, which is synchronized with the line frequency thereby. The clock frequency of the clock generator is chosen in the embodiment as fT=2 MHz, an integral multiple of the 15,625 Hz line frequency in the PAL system. If the circuit is used for systems operating with a different standard, which operate with different line frequencies, then a corresponding multiple of this line frequency is generated as the clock frequency. As a result the circuit is insensitive to frequency deviations within a system and is also suitable for use in systems operating with different line frequencies.

Now the second field will be taken by way of example to describe the time-sequential operation. The last line of every second field is only written half in the PAL system and appears before half the line period of the first pre-equalizing pulse (t4 in FIG. 2), which marks the beginning of the V-interval. The first monostable multivibrator 71 is set again by the leading edge of the pre-equalizing pulse. The second monostable multivibrator 72 is however not reset until after the end of half the line period and before the end of the whole line period (t5), so that in this case it is still in the set state at the appearance of the first pre-equalizing pulse and is not reset until the first monostable multivibrator 71 has been set again. This situation is recognized as the beginning of the V-interval by a subsequent counting circuit 9, which is connected to the outputs of the two monostable multivibrators 71 and 72 and operates as a V-interval recognizing circuit.

The length of the V-interval is fixed and corresponds to approximately the duration of 7.5 lines (PAL) or 9 lines (NTSC). The counting circuit 9 is started at the beginning of the V-internal and is switched further for 7.5 or 9 lines by the output pulse of the monostable multivibrator 72, whereafter it is again reset to the starting state.

The output signal of the clock generator 10 is applied to a clock input (T) of the counting circuit 8, which is always started line-synchronously by the output pulse of the second monostable multivibrator 72. The counting circuit 8 is reset again befor ethe end of a line period, which can be effected in known manner (for example by combining suitable counter outputs). Impulses occur at different instants at two outputs 81 and 82. A changeover device 11 always switches one of these two outputs to the input of the sample-and-hold circuit 3. The changeover device 11 is controlled by the counting circuit 9, which acts as a V-interval recognizing circuit.

Figures 3, 4:
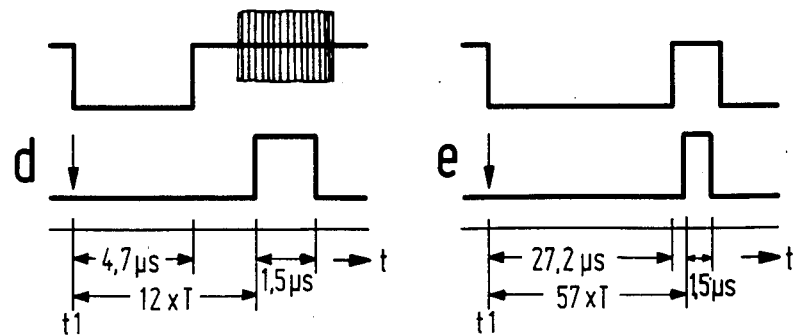

During the transmission of the line signals of a field the output 81 is connected to the sample-and-hold circuit 3. Each time after the counting circuit 8 has been enabled by means of an output pulse of the monostable multivibrator 72, produced by a synchronizing pulse, a pulse is supplied from the output after $12 \times T = 6$ μs (FIG. 3). At the occurrence of the synchronizing pulse (first line of FIG. 3), the starting pulse for the counting circuit 8 appears, which is shown in FIG. 3 in the second line at t1 by means of an arrow d. The pulse at the output 81 occurs 6 μs later, during the period of time in which the color burst occurs, so that reliable clamping onto the blanking level occurs.

If after the transmission of, for example, a second field, the beginning of the V-interval is detected by the counting circuit 9, which acts as a V-interval recognizing circuit, then the output 82 is connected to the sample-and-hold circuit 3 by means of the change-over device 11. During a pre-equalizing pulse (first line in FIG. 4) a pulse always appears at this output 82 $57 \times T = 28.5$ μs after the start (arrow e) of the counting circuit 8 effected at instant t1 (FIG. 4).

By changing the time delay it is ensured that also during the V-interval clamping onto the blanking level occurs.

The time delays are determined by counting circuits, so that they can be adjusted very accurately. In the embodiment the start of the clamping pulses can be fixed to occur in steps of 0.25 μs, its width can be selected freely in 0.5 μs stages. Moreover, as a result thereof, the time duration of the clamping pulse does not depend on the time constants of monostable multivibrators and the circuit automatically adapts itself to different video signals.

The clamping circuit used in the embodiment operates in accordance with the compensation method. The described arrangement is however also suitable for use as a keyed clamping circuit.

What is claimed is:
1. A circuit for generating clamping pulses for a clamping circuit for regeneration of an average picture luminance of a video signal comprising:
   first and second monostable multivibrators for producing time-frequency clock pulses from video signal synchronization pulses of said video signal;
   a first counting circuit for detecting vertical blanking intervals having inputs connected to outputs of said first and second monostable multivibrators respectively to produce a controlling output; and a second counting circuit having an input connected to the output of said second monostable multivibrator, a control input for receiving said controlling output and two outputs for alternately supplying said clamping pulses to said clamping circuit at different instances in response to said controlling output.

2. A circuit as claimed in claim 1 wherein said first and second monostable multivibrators have different time constants.

3. A circuit as claimed in claim 1 wherein the controlling output of said first counting circuit alternately activates the outputs of said second counting circuit by the use of a change-over device which is controlled by said first counting circuit, said device having said two inputs connected to two outputs of said second counting circuit and an output connected to said clamping circuit.

4. A circuit claimed in claim 1 wherein said first and second monostable multivibrators are not retriggerable.

5. A circuit as claimed in claim 1 wherein the time constant of said first monostable multivibrator exceeds the duration of asynchronizing pulse and is less than half a line period, and wherein the time constant of said second monostable multivibrator exceeds half the line period and is less than the whole line period.

6. A circuit for producing clamping pulses from a video signal comprising:
   a synchronization pulse detecting means connected to separate synchronization pulses from said video signal;
   first and second monostable multivibrators connected to be triggered by said separated synchronization pulses, each providing an output pulse of a predetermined width;
   a first counter connected to said first and second monostable multivibrators for detecting a vertical interval in said video signal;
   a clock generator for providing clock pulses synchronized to said second monostable multivibrator output pulse;
   a second counter for counting said clock pulses, said second counter connected to be enabled by the output pulse of said second multivibrator, said second counter providing first and second clamping pulses which are timed with respect to an edge of pulses produced by said second multivibrator; and
   switching means connected to receive said first and second clamping pulses from said second counter, said switching means connected to said first counter for supplying one of said first and second clamping pulses depending upon the presence or absence of said vertical interval in said video signal.

7. A circuit for generating clamping pulses for a clamping circuit for regeneration of an average picture luminance of a video signal comprising:
   first and second monostable multivibrators for producing time-frequency clock pulses from video signal synchronization pulses of said video signal;
   a first counting circuit for detecting vertical blanking intervals having inputs connected to outputs of said first and second monostable multivibrators respectively to produce a controlling output;
   a second counting circuit having an input connected to the output of said second monostable multivibrator, a control input for receiving said controlling output and two outputs for alternately supplying said clamping pulses to said clamping circuit at different instances in response to said controlling output; and
   a clock generator having a synchronizing input connected to the output of one of said first and second monostable multivibrators and an output connected to a clock input of said second counting circuit.

8. A circuit as claimed in claim 7 wherein the frequency of said clock generator is an integral multiple of a synchronizing pulse frequency.

* * * * *